United States Patent
Navaraj et al.

(10) Patent No.: US 9,003,501 B2
(45) Date of Patent: Apr. 7, 2015

(54) METHOD AND SYSTEM FOR PROTECTING AGAINST UNKNOWN MALICIOUS ACTIVITIES BY DETECTING A HEAP SPRAY ATTACK ON AN ELECTRONIC DEVICE

(75) Inventors: J. McEnroe Samuel Navaraj, Bangalore (IN); Rahul C. Kashyap, Foster City, CA (US)

(73) Assignee: McAfee, Inc., Santa Clara, CA (US)

( * ) Notice: Subject to any disclaimer, the term of this patent is extended or adjusted under 35 U.S.C. 154(b) by 1110 days.

(21) Appl. No.: 12/962,439

(22) Filed: Dec. 7, 2010

(65) Prior Publication Data
US 2012/0144486 A1    Jun. 7, 2012

(51) Int. Cl.
*H04L 29/06* (2006.01)
*G06F 21/00* (2013.01)
*G06F 21/52* (2013.01)

(52) U.S. Cl.
CPC .................................. *G06F 21/52* (2013.01)

(58) Field of Classification Search
CPC ........................................................ G06F 21/52
USPC ................................................. 726/5, 22–25
See application file for complete search history.

(56) References Cited

U.S. PATENT DOCUMENTS

| 8,307,435 | B1 * | 11/2012 | Mann et al. | 726/22 |
| 2009/0300764 | A1 * | 12/2009 | Freeman | 726/24 |
| 2012/0222116 | A1 * | 8/2012 | Chenette | 726/23 |

OTHER PUBLICATIONS

Gadaleta et al., "BuBBle: A Javascript Engine Level Countermeasure against Heap Spraying Attacks", ESSoS 2010, LNCS 5965 pp. 1-17, 2010.*

* cited by examiner

*Primary Examiner* — Lisa Lewis
(74) *Attorney, Agent, or Firm* — Baker Botts L.L.P.

(57) ABSTRACT

A method and system for protecting against unknown malicious activities by detecting a heap spray attack on a electronic device are disclosed. A script is received at an electronic device from a remote device via a network and a loop operation is detected in the script that contains a write operation operable to write data to a memory of the electronic device. The amount of the data operable to be written to the memory by the write operation is determined and the data is prevented from being written to the memory if the amount of the data is greater than or equal to a threshold.

24 Claims, 2 Drawing Sheets

METHOD AND SYSTEM FOR PROTECTING AGAINST UNKNOWN MALICIOUS ACTIVITIES BY DETECTING A HEAP SPRAY ATTACK ON AN ELECTRONIC DEVICE

TECHNICAL FIELD OF THE INVENTION

The present invention relates generally to computer security and malware protection and, more particularly, to a method and system for protecting against unknown malicious activities by detecting a heap spray attack on an electronic device.

BACKGROUND

Attacks that exploit a vulnerability of a client-side application are increasing. One type of attack uses a heap spray technique to facilitate arbitrary code execution by filling a location in memory used for dynamic memory allocation with a sequence of data in order to compromise an application. Typically, a heap spray attack is implemented using a scripting language such as JavaScript or VBScript. The script creates large strings with the same character(s) repeated many times such that the string may have a maximum length allowed by the scripting engine and then concatenates a shellcode at the end of the string. The shellcode typically includes malicious code such that when the shellcode is executed, the application is compromised. By filling large blocks of the memory with multiple copies of the same data, the heap spray technique increases the chance that the shellcode will be executed when a process associated with the application jumps to a location in the memory due to vulnerability in the application.

Current solutions for preventing heap spray attacks include the use of pattern based signatures and hash tables to detect possible malware. These techniques can only detect known attacks because a write detection signature for each sample based on the evasion technique must be used. Additionally, attackers can easily avoid these detection mechanisms by using a different code or programming based evasion techniques.

SUMMARY

In accordance with the present disclosure, the disadvantages and problems associated with protecting against unknown malicious activities have been substantially reduced or eliminated. In a particular embodiment, a method for detecting a heap spray attack includes receiving a script at an electronic device from a remote device via a network and detecting a loop operation in the script that contains a write operation operable to write data to a memory of the electronic device. The amount of the data operable to be written to the memory by the write operation is determined and the data is prevented from being written to the memory if the amount of the data is greater than or equal to a threshold.

In accordance with another embodiment of the present disclosure, an electronic device for detecting a heap spray attack includes a processor communicatively coupled to a computer readable memory and processing instructions encoded in the computer readable memory. The processing instructions, when executed by the processor, may be operable to perform operations including receiving a script from a remote device via a network and detecting a loop operation in the script that contains a write operation operable to write data to the computer readable memory. The processing instructions further may be operable to perform operations including determining an amount of the data operable to be written to the computer readable memory and preventing the data from being written to the computer readable memory if the amount of the data is greater than or equal to a threshold.

In accordance with an additional embodiment of the present disclosure, a non-transitory computer readable medium stores instructions for detecting a heap spray attack. The instructions are configured to, when executed by a processor, receive a script at an electronic device from a remote device via a network and detect a loop operation in the script that contains a write operation operable to write data to a memory of the electronic device. The instructions are further configured to determine an amount of the data operable to be written to the memory by the write operation and prevent the data from being written to the memory if the amount of the data is greater than or equal to a threshold.

In accordance with a further embodiment of the present disclosure, a method for detecting a heap spray attack includes receiving a script at an electronic device from a remote device via a network and detecting a loop operation in the script that contains a write operation operable to write a string to a memory of the electronic device. The size of the string operable to be written to the memory by the write operation may be determined based on one iteration of the loop operation and the aggregate size of multiple copies of the string operable to be written to the memory by the write operation may be determined based on a total number of iterations of the loop operation. The string is prevented from being written to the memory if the size of the string is greater than or equal to a first threshold and the aggregate size of the multiple copies of the string is greater than or equal to a second threshold.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Embodiments of the present disclosure and their advantages are best understood by reference to FIGS. 1 through 4, where like numbers are used to indicate like and corresponding parts.

Figure 1:
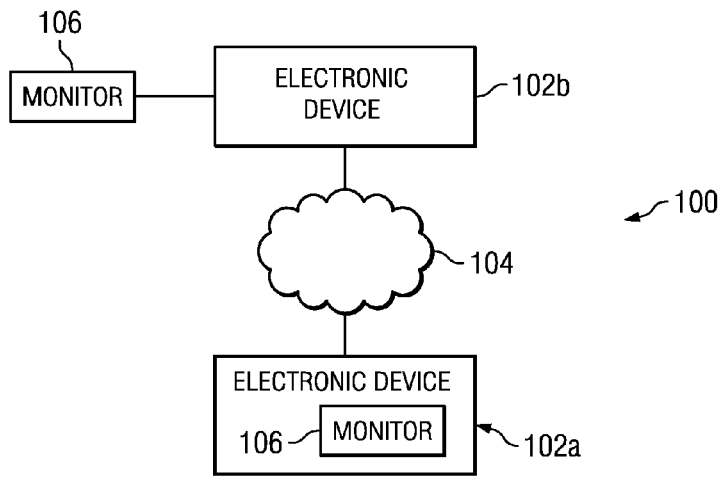
FIG. 1 illustrates a block diagram of a network including a monitor for protecting against unknown malicious activities by detecting a heap spray attack in accordance with the teachings of the present disclosure.

FIG. 1 illustrates a block diagram of a network including a monitor for protecting against unknown malicious activities by detecting a heap spray attack in accordance with the teachings of the present disclosure. Malicious activities may be in the form of digital content that produces unwanted activity in a system. Types of malicious activities may include, but are not limited to, viruses, Trojans, worms, spyware, unsolicited electronic messages, phishing attempts, or any combination thereof.

System 100 may include electronic devices 102 communicatively coupled to network 104. Electronic devices 102 may include a computer, a personal data assistant (PDA), a phone, or any other device configurable to interpret and/or execute program instructions and/or process data. In one embodiment, electronic device 102a may be a client (e.g., a personal computer or PDA) and electronic device 102b may be a server such that electronic device 102a may communicate with electronic device 102b over network 104.

Although a specific network is illustrated in FIG. 1, the term "network" may be interpreted as generically defining any network capable of transmitting telecommunication signals, data and/or messages. Network 104 represents any suitable collection and arrangement of communications equipment supporting the transport and delivery of data. For example, network 104 may be one or a collection of components associated with a local area network (LAN), a wide area network (WAN), a back-haul network, a global computer network such as the Internet, or any other communications equipment suitable for providing wireless and/or wireline communications. In a particular embodiment, network 104 may be an Internet Protocol (IP) network.

Monitor 106 may be associated with electronic devices 102 in order protect against unknown malicious activities by detecting a heap spray attack. In the illustrated embodiment, monitor 106 may be integral to electronic device 102a and monitor 106 may be communicately coupled electronic device 102b. Although the illustrated embodiment shows that monitor 106 is directly coupled to electronic device 102b, monitor 106 may be remotely coupled to electronic device 102b via, for example, network 104.

In operation, system 100 may protect electronic devices 102 from malicious activities by detecting an attack using a heap spray technique. Specifically, monitor 106 associated with each of electronic devices 102 may use a heuristic based technique to determine if a write operation directed to a portion of the memory is a heap spray attack. In one embodiment, the write operation may be included in a script (e.g., JavaScript and/or VBScript) received from, for example, a remote device (not expressly shown) via network 104 in response to a user request to download content from the remote device. Monitor 106 may first determine whether the write operation is included in an iteration statement. For example, the iteration statement may be a loop operation that includes at least one segment of code that is executed several times in succession. The loop operation may be any type of iteration statement that is repeated multiple times based on a condition, including, but not limited to, a for loop, a while loop, a conditional loop, a jump loop and a goto loop. If a loop operation is detected, monitor 106 may determine the size of the data being written by the write operation each time that the loop operation is executed. Monitor may also determine the aggregate size of the data being written by the write operation based on the total number of iterations for the loop operation. In one embodiment, monitor 106 may determine that the write operation is a heap spray attack if the size of the data being written by the write operation is greater than or equal to a first threshold. In another embodiment, if the aggregate size of the data being written based on the total number of iterations for the loop operation is greater than or equal to a second threshold, monitor 106 may determine that the write request is a heap spray attack. In a further embodiment, monitor 106 may evaluate both the size of the data each time that the loop operation is executed and the aggregate size of the data based on the total number of iterations for the loop operation in order to determine whether the write operation is a heap spray attack. If monitor 106 determines that the write operation is a heap spray attack, monitor 106 prevents the data from being written on electronic devices 102.

Detecting an attack using a heap spray technique by evaluating the size of an individual piece of data being written in a loop operation and/or the aggregate size of the data written based on the total number of iterations of the loop operation has the advantage of being able to detect both known and unknown attacks. Other solutions, however, rely on signatures to identify the attack or identification of a particular vulnerability in an application and thus, cannot detect unknown attacks. Additionally, the current solution does not rely on determining that an application has a specific vulnerability. Rather, the solution is based on the fact that all heap spray techniques generally use iterative statements to write multiple copies of the same data to large blocks of memory in an electronic device.

Figure 2:
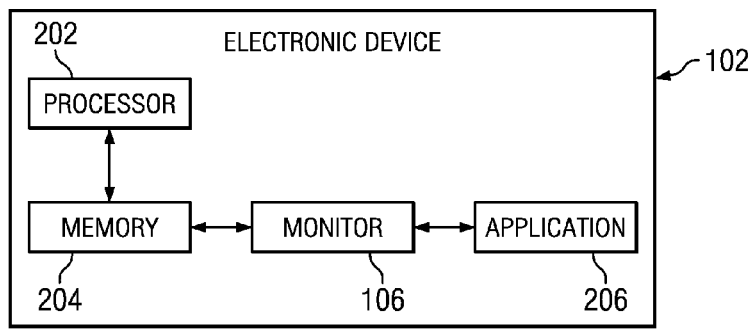
FIG. 2 illustrates a block diagram of an electronic device including a monitor for protecting against unknown malicious activities by detecting a heap spray attack in accordance with the teachings of the present disclosure.

FIG. 2 illustrates a block diagram of an electronic device including a monitor for protecting against unknown malicious activities by detecting a heap spray attack in accordance with the teachings of the present disclosure. Specifically, electronic device 102 may include processor 202, memory 204, application 206 and monitor 106.

Electronic device 102 may include processor 202 functionally coupled to memory 204. In certain embodiments, processor 202 may be, for example, a microprocessor, microcontroller, digital signal processor (DSP), application specific integrated circuit (ASIC), or any other digital or analog circuitry configured to interpret and/or execute program instructions and/or process data. In some embodiments, processor 202 may interpret and/or execute program instructions and/or process data stored in memory 204. Memory 204 may include any system, device, or apparatus configured to store one or more memory modules. Each memory module may include any system, device or apparatus configured to retain program instructions and/or data for a period of time (e.g., computer-readable media). For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other electromagnetic and/or optical carriers; and/or any combination of the foregoing.

Electronic device 102 may also include monitor 106 and application 206, which may be executed by processor 202 while stored in memory 204. Application 206 may be a process, an executable, a shared library, a driver, a device driver, a run-time-engine, an operating system, object code, or any other binary instructions configured to be executed by electronic device 102. In specific embodiments, application 206 may include, but is not limited to, a browser application, an email application, a word processing application, a spreadsheet application, a presentation application, an application that supports the portable document format (PDF) or any other suitable desktop application. Monitor 106 may be an application that is configured to determine whether a write operation directed to write data to a portion of memory 204 is a heap spray attack. In another embodiment, monitor 106 may be remote from electronic device 102 such that it resides on a device in a cloud computing server accessible over a network, such as network 104. In this embodiment, monitor 106 may be integral to or associated with, for example, another electronic device such that electronic device 102 may be protected from heap spray attacks even if monitor 106 is not installed on electronic device 102.

In operation, electronic device 102 may receive from, for example, a remote device via network 104 a script including a write operation directed to write data into memory 204. The script may be JavaScript, VBScript or any other script written in an appropriate scripting language. In one embodiment, the data being written may be a string that includes a pattern of repeated characters concatenated with a shellcode. In other embodiments, the data may be a string that includes one or more No Operation (NOP) commands concatenated with a shellcode. Monitor 106 may first determine whether the write operation is included in an iteration statement, such as a loop operation. If the write operation is included in a loop operation, monitor 106 may evaluate the size of the string being written by the write operation each time the loop operation is executed. Monitor 106 may further evaluate the aggregate size of the data being written based on the total number of iterations for the loop operation.

In one embodiment, monitor 106 may compare the size of the string being written by the write operation to a first threshold. If the size of the string is greater than or equal to the first threshold, monitor 106 may determine that the script contains a heap spray attack and may prevent the data from being written to memory 204. If the size of the string is less than the first threshold, monitor 106 may determine that the script is not malicious and may allow the data to be written to memory 204.

In another embodiment, monitor 106 may compare the aggregate size of multiple copies of the string being written by the write operation based on the total number of iterations for the loop operation. If the aggregate size of the multiple copies of the string is greater than or equal to a second threshold, monitor 106 may determine that the script contains a heap spray attack and may prevent the data from being written to memory 204. If the aggregate size of the multiple copies of the string is less than the second threshold, monitor 106 may determine that the script is not malicious and may allow the data to be written to memory 204.

In a further embodiment, monitor 106 may compare the size of the string to the first threshold and the aggregate size of the multiple copies of the string to the second threshold. If the size of the string is greater than or equal to the first threshold and the aggregate size of the multiple copies of the string is greater than or equal to the second threshold, monitor 106 may determine that the script contains a heap spray attack and may prevent the data from being written to memory 204. If the size of the string is less than the first threshold and the aggregate size of the multiple copies of the string is less than the second threshold, monitor 106 may determine that the script is not malicious and may allow the data to be written to memory 204.

Figure 3:
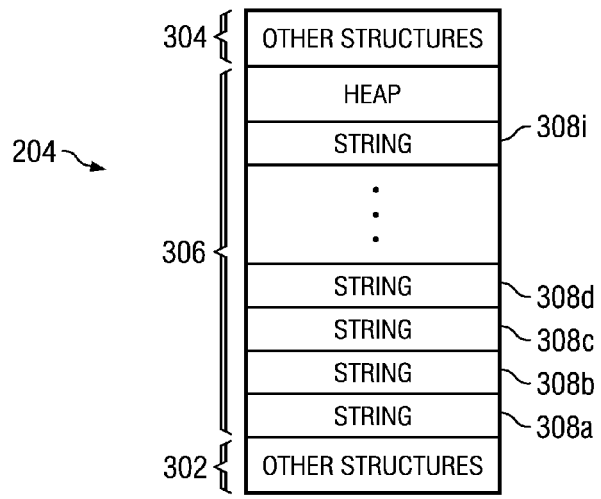
FIG. 3 illustrates a diagram of a memory associated with an electronic device when a heap spray technique writes data to the memory in accordance with the teachings of the present disclosure.

FIG. 3 illustrates a diagram of a memory associated with an electronic device when a heap spray technique writes data to the memory in accordance with the teachings of the present disclosure. In the illustrated embodiment, memory 204 may include multiple address ranges such as low address range 302, high address range 304 and heap address range 306. Low address range 302 and high address range 304 may be used to store data, instructions, and other information. Heap address range 306 may be dynamic allocation memory that is used to store data for an application (e.g., application 206 as illustrated in FIG. 2) during runtime of the application.

During operation, electronic device 102 (as illustrated in FIGS. 1 and 2) may receive a script from a remote device via network 104 in response to a user request. In one embodiment, a user may click on a link in a web page displayed in a browser application and the script may be downloaded to electronic device 102 in response to the user clicking on the link. The script may, for example, contain a write operation included in a loop operation as shown by the following example:

$$\text{for}(i=0; i<\text{arraysize}; i++) \{\text{myarray}[i]=\text{nop}+\text{shellcode};\}$$

where i is loop counter that controls the number of iterations for the loop operation, "nop" is a NOP command that performs no function, "shellcode" includes an executable including malicious code that, when executed by application 206, may compromise application 206 and "myarray[i]" is a string that may be written to memory 204 a total of number of times equal to the number of iterations for the loop operation.

As illustrated, string 308a through 308i may be written into heap address range 306 if the loop operation containing the write operation is executed such that strings 308 may occupy a large portion of the memory in heap address range 306. After the script is executed, application 206 may continue to run and access heap address range 306 in memory 204 to store and retrieve data. If application 206 selects an address corresponding to one of strings 308, the shellcode including a malicious activity may be executed and may compromise application 206.

In current heap spray techniques, the loop operation containing a string including a concatenation of, for example, NOP commands with shellcode, typically cannot be optimized without compromising on the success rate. Thus, this type of loop operation may be present in each heap spray attack regardless of the type or amount of data included in the string. Although the illustrated embodiment includes one write operation contained in the loop operation, the present disclosure contemplates loop operations including more than one write operation such that strings 308 in heap address range 306 may not contain the same data. For example, the loop operation may include two write operations that write two different strings. In this embodiment, strings 308a and 308c may include one combination of NOP commands and shellcode and strings 308b and 308d may include another combination of NOP commands and the same or different shellcode.

The current solution detects the loop operation including string 308 and prevents string 308 from being written to heap address range 306 of memory 204. For example, monitor 106 (as illustrated in FIGS. 1 and 2) may detect the loop operation in the script. Monitor 106 may then determine the size of string 308 to be written by write operation each time loop operation is executed and may further determine the aggregate size of the multiple copies of string 308 (e.g., string 308a through string 308i) written by write operation based on the total number of iterations of the loop operation. In one embodiment, monitor 106 may compare the size of string 308 with a first threshold and determine that the script contains a heap spray attack if the size of string 308 is greater than or equal to the first threshold. In another embodiment, monitor 106 may compare the aggregate size of the multiple copies of string 308 with a second threshold and determine that the script contains a heap spray attack if the aggregate size of the multiple copies of string 308 is greater than or equal to a second threshold. In a further embodiment, monitor 106 may compare the size of string 308 with the first threshold and the aggregate size of the multiple copies of string 308 with the second threshold. If the size of string 308 is greater than or equal to the first threshold and the aggregate size of the multiple copies of string 308 is greater than or equal to the second threshold, monitor 106 may determine that the script contains a heap spray attack. In each embodiment, monitor 106 may prevent strings 308 from being written to heap address range 306 of memory 204 and thus, prevent application 206 from being compromised.

Figure 4:
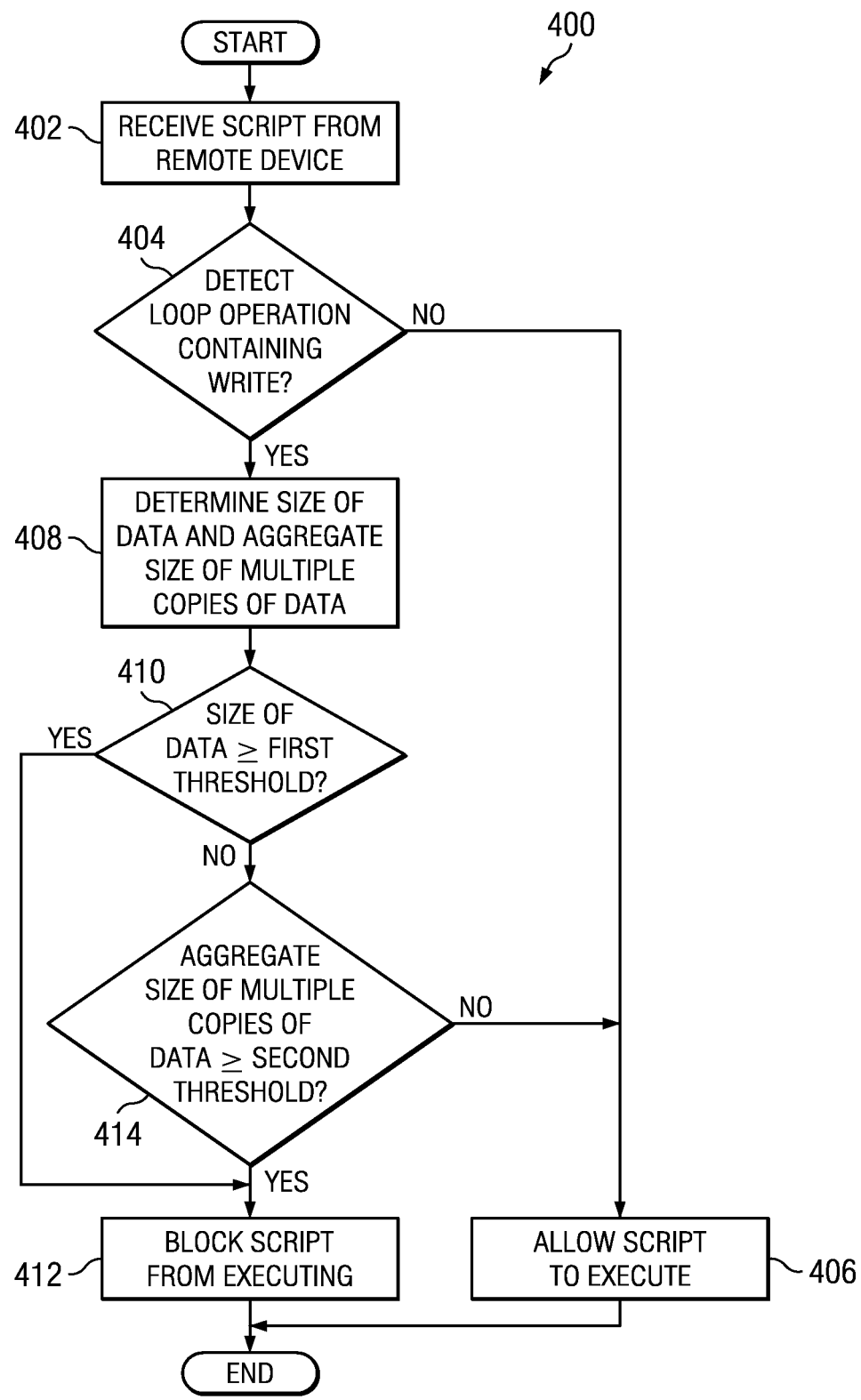
FIG. 4 illustrates a flow chart of a method for protecting against unknown malicious activities by detecting a heap spray attack on an electronic device in accordance with the teachings of the present disclosure.

FIG. 4 illustrates a flow chart of a method for protecting against unknown malicious activities by detecting a heap spray attack on an electronic device. Generally, electronic device 102 (as illustrated in FIG. 1) may receive a script including a write operation directed to memory 204 (as illustrated in FIG. 2) from a remote device via network 104. Monitor 106 associated with electronic device 102 may determine if the script includes a loop operation containing the write operation. If the script includes a loop operation, monitor 106 determines a size of the data being written by the write operation and determines an aggregate size for the total number of copies of the data that are written by the write operation based on the number of times that the loop operation is executed. Monitor 106 then determines whether the script includes a heap spray attack based on the size of the data and/or the aggregate size of the multiple copies of the data.

Method 400 starts at step 402 when electronic device 102 receives a script from a remote device via network 104. In one embodiment, the script may be a JavaScript, a VBScript and/or any other script based on an appropriate scripting language. The script may be received in response to a user clicking on a link in application 206 such as a browser application, an application that supports the portable document format (PDF) or any other application that supports execution of a script.

At step 404, monitor 106 associated with electronic device 102 may determine whether the script includes a loop operation containing a write operation. If the script does not include a loop operation, monitor 106 allows the script to be executed by application 206 at step 406.

If the script includes a loop operation, monitor 106 determines a size of the data being written by the write operation and determines an aggregate size of the multiple copies of the data being written by the write operation based on the total number of iterations of the loop operation at step 408. In one embodiment, the loop operation may include a single write operation directed to write data to memory 204 of electronic device 102. In another embodiment, the loop operation may include more than one write operation direction to write data to memory 204 of electronic device. Each write operation may include the same or different data to be written to memory 204. The data may be a string including repeated characters and/or one or more NOP commands concatenated with a shellcode that contains malicious code such that, when executed, may compromise application 206. In operation, each time loop operation is executed the write operation(s) may write data to heap address range 306 (as illustrated in FIG. 3) of memory 204.

At step 410, monitor 106 determines if a size of the data to be written by the write operation is greater than or equal to a first threshold. In one embodiment, the first threshold may have a range of approximately 750 kilobytes (KB) to approximately 1.5 megabytes (MB). If the size of the data is greater than or equal to the first threshold, monitor 106 may block the script from being executed by application 206 at step 412. If the size of the data is less than the first threshold, monitor 106 may then determine whether the aggregate size of all copies of the data directed to be written to memory 204 based on the total number of iterations of the loop operation is greater than or equal to a second threshold at step 414. In one embodiment, the second threshold may have a range of approximately 70 MB to approximately 150 MB. If the aggregate size of all copies of the data is greater than or equal to the second threshold, monitor 106 may block the script from being executed by application 206 at step 412. If the aggregate size of all copies of the data is less than the second threshold, monitor 106 may allow the script to be executed by application 206 at step 406.

Although FIG. 4 illustrates a specific order and number of steps to be performed, the method may include other steps and the steps may be performed in a different order. For example, step 410 may be skipped such that step 408 may continue directly to step 414 in order to determine whether the aggregate size of all copies of the data are greater than or equal to the second threshold. Additionally, step 414 may be skipped such that step 410 may continue to step 406 if monitor 106 determines that the size of the data is less than the first threshold. Further, if monitor 106 determines that the size of the data is greater than the first threshold at step 410, the method may continue to step 414 in order to further determine if the aggregate size of all copies of the data based on the total number of iterations of the loop operation is greater than or equal to the second threshold. Step 408 may also be broken into multiple steps such that monitor 106 determines the size of the data operable to be written by the write operation based on one iteration of the loop operation and the size of the multiple copies of the data operable to be written by the write operation based on the total number of iterations of the loop operation in separate steps.

Although the present disclosure has been described in detail, it should be understood that various changes, substitutions, and alterations can be made hereto without departing from the spirit and the scope of the disclosure as defined by the appended claims.

What is claimed is:

1. A method for detecting a heap spray attack, comprising:
receiving a script at an electronic device from a remote device via a network;
detecting a loop operation in the script that contains a write operation operable to write data to a memory of the electronic device;
determining an amount of the data operable to be written to the memory by the write operation;
based at least on a determination that the data is greater than or equal to a threshold, detecting a potential heap spray attack and preventing the data from being written to the memory; and
based at least on a determination that the data is less than the threshold, allowing the script to be executed.

2. The method of claim 1, wherein:
the amount of data comprises a size of the data based on one iteration of the loop operation; and
the threshold is between 750 kilobytes (KB) and 1.5 megabytes (MB).

3. The method of claim 1, wherein:
the amount of data comprises an aggregate size of multiple copies of the data based on a total number of iterations of the loop operation; and
the threshold is between 70 megabytes (MB) and 150 MB.

4. The method of claim 1, wherein:
the amount of data comprises a size of the data based on one iteration of the loop operation and an aggregate size of multiple copies of the data based on a total number of iterations of the loop operation; and the threshold comprises a first threshold and a second threshold.

5. The method of claim 4, further comprising preventing the data from being written to the memory if:
the size of the data based on one iteration of the loop is greater than or equal to the first threshold; and
the aggregate size of the multiple copies of the data based on the total number of iterations of the loop operation is greater than or equal to the second threshold.

6. The method of claim 1, wherein the data comprises a string including a NOP code and a shellcode.

7. An electronic device for detecting a heap spray attack, comprising:
a processor;
a computer readable memory communicatively coupled to the processor; and
processing instructions encoded in the computer readable memory, the processing instructions, when executed by the processor, operable to perform operations comprising:
receiving a script from a remote device via a network;
detecting a loop operation in the script that contains a write operation operable to write data to the computer readable memory;
determining an amount of the data operable to be written to the computer readable memory;
based at least on a determination that the data is greater than or equal to a threshold, detecting a potential heap spray attack and preventing the data from being written to the computer readable memory; and
based at least on a determination that the data is less than the threshold, allowing the script to be executed.

8. The electronic device of claim 7, wherein:
the amount of data comprises a size of the data based on one iteration of the loop operation; and
the threshold is between 750 kilobytes (KB) and 1.5 megabytes (MB).

9. The electronic device of claim 7, wherein:
the amount of data comprises an aggregate size of multiple copies of the data based on a total number of iterations of the loop operation; and
the threshold is between 70 megabytes (MB) and 150 MB.

10. The electronic device of claim 7, wherein:
the amount of data comprises a size of the data based on one iteration of the loop operation and an aggregate size of multiple copies of the data based on a total number of iterations of the loop operation; and
the threshold comprises a first threshold and a second threshold.

11. The electronic device of claim 10, wherein the processing instructions are further operable to perform operations comprising preventing the data from being written to the memory if:
the size of the data based on one iteration of the loop is greater than or equal to the first threshold; and
the aggregate size of the multiple copies of the data based on the total number of iterations of the loop operation is greater than or equal to the second threshold.

12. The electronic device of claim 7, wherein the data comprises a string including a NOP code and a shellcode.

13. A non-transitory computer readable medium storing instructions for detecting a heap spray attack, the instructions, when executed by a processor, configured to:
receive a script at an electronic device from a remote device via a network;
detect a loop operation in the script that contains a write operation operable to write data to a memory of the electronic device;
determine an amount of the data operable to be written to the memory by the write operation;
based at least on a determination that the data is greater than or equal to a threshold, detecting a potential heap spray attack and prevent the data from being written to the memory; and
based at least on a determination that the data is less than the threshold, allowing the script to be executed.

14. The non-transitory computer readable medium of claim 13, wherein:
the amount of data comprises a size of the data based on one iteration of the loop operation; and
the threshold is between 750 kilobytes (KB) and 1.5 megabytes (MB).

15. The non-transitory computer readable medium of claim 13, wherein:
the amount of data comprises an aggregate size of multiple copies of the data based on a total number of iterations of the loop operation; and
the threshold is between 70 megabytes (MB) and 150 MB.

16. The non-transitory computer readable medium of claim 13, wherein:
the amount of data comprises a size of the data based on one iteration of the loop operation and an aggregate size of multiple copies of the data based on a total number of iterations of the loop operation; and
the threshold comprises a first threshold and a second threshold.

17. The non-transitory computer readable medium of claim 16, wherein the instructions are further configured to prevent the data from being written to the memory if:
the size of the data based on one iteration of the loop is greater than or equal to the first threshold; and
the aggregate size of the multiple copies of the data based on the total number of iterations of the loop operation is greater than or equal to the second threshold.

18. The non-transitory computer readable medium of claim 13, wherein the data comprises a string including a NOP code and a shellcode.

19. A method for detecting a heap spray attack, comprising:
receiving a script at an electronic device from a remote device via a network;
detecting a loop operation in the script that contains a write operation operable to write a string to a memory of the electronic device;
determining a size of the string operable to be written to the memory by the write operation based on one iteration of the loop operation;
determining an aggregate size of multiple copies of the string operable to be written to the memory by the write operation based on a total number of iterations of the loop operation;
based at least on a determination that the size of the string is greater than or equal to a first threshold and the aggregate size of the multiple copies of the string is greater than or equal to a second threshold, detecting a potential heap spray attack and preventing the string from being written to the memory; and
based at least on a determination that the size of the string is less than a first threshold or the aggregate size of the multiple copies of the string is less than a second threshold, allowing the string to be written to the memory.

20. The method of claim 19, wherein:
the first threshold is between 750 kilobytes (KB) and 1.5 megabytes (MB); and
the second threshold is between 70 megabytes (MB) and 150 MB.

21. The method of claim 19, wherein the string comprises a NOP code and a shellcode.

22. The method of claim 19, wherein the write operation comprises a concatenation operation.

23. The method of claim 19, wherein the script is a JavaScript or a VBScript.

24. A non-transitory computer readable medium storing instructions for protecting an electronic device, the instructions, when executed by a processor, configured to:
  detect a script received at an electronic device from a remote device via a network;
  detect a loop operation in the script that contains a write operation operable to write a string to a memory of the electronic device;
  determine a size of the string operable to be written to the memory by the write operation based on one iteration of the loop operation;
  determine an aggregate size of multiple copies of the string operable to be written to the memory by the write operation based on a total number of iterations of the loop operation;
  based at least on a determination that the size of the string is greater than or equal to a first threshold and the aggregate size of the multiple copies of the string is greater than or equal to a second threshold, detecting a potential heap spray attack and preventing the string from being written to the memory; and
  based at least on a determination that the size of the string is less than a first threshold or the aggregate size of the multiple copies of the string is less than a second threshold, allowing the string to be written to the memory.

\* \* \* \* \*